(12) United States Patent
Marx

(10) Patent No.: US 12,296,808 B2
(45) Date of Patent: May 13, 2025

(54) METHOD FOR CONTROLLING A VEHICLE BRAKING SYSTEM AND APPARATUS FOR COMPENSATING A YAW MOMENT ACTING ON A VEHICLE

(71) Applicant: ZF Active Safety GmbH, Koblenz (DE)

(72) Inventor: Andreas Marx, Hartenfels (DE)

(73) Assignee: ZF Active Safety GmbH, Koblenz (DE)

( * ) Notice: Subject to any disclaimer, the term of this patent is extended or adjusted under 35 U.S.C. 154(b) by 191 days.

(21) Appl. No.: 18/075,641

(22) Filed: Dec. 6, 2022

(65) Prior Publication Data
US 2023/0192044 A1    Jun. 22, 2023

(30) Foreign Application Priority Data
Dec. 20, 2021   (DE) .......................... 102021133873.5

(51) Int. Cl.
*B60T 8/1755*   (2006.01)

(52) U.S. Cl.
CPC ....... *B60T 8/17551* (2013.01); *B60T 2220/04* (2013.01); *B60T 2230/02* (2013.01); *B60T 2250/03* (2013.01)

(58) Field of Classification Search
CPC ............. B60T 8/17551; B60T 2220/04; B60T 2230/02; B60T 2250/03; B60T 8/172; B60T 8/1755; B60T 8/17; B60T 8/171; B60T 8/174; B60T 8/17552; B60T 8/17554; B60W 30/18109
See application file for complete search history.

(56) References Cited

U.S. PATENT DOCUMENTS 7,137,673 B2 * 11/2006 Anwar .................. B60T 8/1755
                                                  188/164

FOREIGN PATENT DOCUMENTS

| DE | 10160045 A1 | 8/2002 |
|---|---|---|
| DE | 112016005745 T5 | 11/2018 |
| DE | 102021201046 A1 | 8/2022 |
| WO | 2004045897 A1 | 6/2004 |

* cited by examiner

*Primary Examiner* — Yuen Wong
(74) *Attorney, Agent, or Firm* — Kristin L. Murphy

(57) ABSTRACT

The disclosure relates to a method for controlling a vehicle braking system on the basis of vehicle-specific data, wherein the vehicle braking system comprises individually actuatable brakes. In the method, a braking operation is detected, a status condition is queried during a temporal observation window, and a yaw variable present and a physical characterizing variable present at the same time are detected. Subsequently, the detected yaw variable is stored and the yaw variable is assigned to a data set. This is repeated in order to create a database. Further, a corrective braking force is determined and the braking force of a brake is automatically adjusted depending on the corrective braking force to reduce the yaw variable. The disclosure also relates to an apparatus for compensating a yaw moment acting on a vehicle.

12 Claims, 5 Drawing Sheets

METHOD FOR CONTROLLING A VEHICLE BRAKING SYSTEM AND APPARATUS FOR COMPENSATING A YAW MOMENT ACTING ON A VEHICLE

CROSS-REFERENCE TO RELATED APPLICATION

This application claims priority to German Priority Application No. 102021133873.5, filed Dec. 20, 2021, the disclosure of which is incorporated herein by reference in its entirety.

TECHNICAL FIELD

The disclosure relates to a method for controlling a vehicle braking system. The disclosure further relates to an apparatus for compensating a yaw moment acting on a vehicle.

BACKGROUND

A yaw moment can be generated during a braking operation if asymmetrical braking forces are present. Asymmetrical braking forces are understood to be braking forces that act on one each of the two vehicle wheels of a vehicle axle and do not have the same value, so that there is a braking force difference between the existing braking forces of the vehicle wheels of a vehicle axle. The yaw moment is dependent here on the total braking force difference between the vehicle wheels on one side of the vehicle and those on the other side of the vehicle. As a result, the vehicle begins to lean as a reaction to the yaw moment during the braking operation.

The value of the yaw moment depends on the braking force difference and the geometric position of the vehicle tyre or the wheel suspension in relation to the vehicle's centre of gravity or its centre axis. Furthermore, the vehicle behaviour can also be influenced by the axle geometry of the vehicle in question, such as the steering roll radius of the front axle. In any case, a yawing movement of the vehicle is undesirable and should be prevented. For this reason, it is important to prevent or minimize yaw moments during braking.

An asymmetric braking force can be caused both by external influences as well as by vehicle-related influences.

An external influence would be, for example, a road surface that provides a different coefficient of friction for the vehicle wheels on one side than for the vehicle wheels on the other side. Thus, during a braking operation, there could be a braking force difference between the vehicle sides that causes a yaw moment. Yaw moments induced by external influences are not to be considered in this application.

Vehicle-related influences can be, for example, uneven wear at the chassis and/or the brakes, so that a braking force difference is caused between two brakes of an axle.

Furthermore, in braking systems with at least two brakes that are actuated individually, for example electromechanical brakes, such as break-by-wire brakes, a braking force difference can occur due to tolerances in the manufacture of the brakes.

Thus, vehicle-related influences apply individually for each vehicle and may be subject to change over time.

SUMMARY

What is needed is a method and an apparatus which compensate a yaw moment caused by vehicle-related asymmetrical braking forces and acting on a vehicle, in order to increase vehicle safety during braking operations. Furthermore, it should be possible to implement the apparatus as cost-effectively as possible.

In accordance with the disclosure, a method for controlling a vehicle braking system is disclosed on the basis of vehicle-specific data, wherein the vehicle braking system comprises at least two individually actuatable brakes, comprising the following method steps:
a) recognizing a braking operation;
b) querying at least one state condition influencing the braking operation during a temporal observation window;
c) detecting a yaw variable present within the observation window and during the braking operation and at least one physical variable present at the same time which characterizes the current braking operation;
d) in the presence of the at least one state condition during the observation window, storing the detected yaw variable and assigning the yaw variable to a data set comprising the at least one physical variable characterizing the current braking operation;
e) repeating steps a) to d) for further braking operations to create a database comprising multiple data sets;
f) determining a corrective braking force in a subsequent braking operation on the basis of one of the data sets assigned to the current characterizing physical variable; and
g) automatically adjusting the braking force of at least one brake of the braking system depending on the corrective braking force to reduce the yaw variable.

The basic concept of the disclosure is to individually detect the individual braking behaviour, for example the acting yaw variable, during the braking operation of a specific vehicle, to store it in a data set in this vehicle and to create a separate database for this vehicle. On the basis of the database, which is thus specific to the vehicle and contains empirical vehicle-specific data, the normally acting yaw variable during a braking operation defined via a characterizing physical variable is known, and therefore a corrective braking force can be determined, which produces a compensating torque opposite to the acting yaw variable and compensates the yaw variable.

In addition to the value of the yaw variable, consideration is also given to the sign of the yaw moment acting about the vehicle vertical axis in order to apply the corrective braking force to the brake/the brakes that actually results in a compensating moment against the yaw moment.

It is conceivable here that the braking force of a brake is increased on the basis of the corrective braking force.

Furthermore, it is also possible that a braking force is reduced via the corrective braking force.

In addition, the braking forces could be increased or decreased simultaneously at several brakes on the basis of the corrective braking force, thus creating an overall compensating torque that reduces the value of the yaw variable.

In order to ensure that the yaw variable is only stored for braking operations that also correspond to the desired braking operations, a query of the state condition takes place in step b), according to which filtering takes place in step d). In this way, it can be determined whether or not the braking operation for which the yaw variable was detected fulfils the state conditions.

The physical variable that is present during the braking operation and characterizes the current braking operation, which is detected in step c), is used to assign the detected yaw variable to a data set in step d), so that a data set only contains yaw variables that were also recorded during braking operations that are at least similar. In this way, the yaw variable that was recorded within a temporal observation window during a braking operation is assigned to a data set via the characterizing variable, so that it is possible to compare the yaw variables with each other and, under certain circumstances, a trend can be seen as to how the yaw variable behaves with an at least similar characterizing variable during the braking operation.

Furthermore, changes in yaw variable over time can also be recognized via vehicle operation.

This process is repeated in step e) so that more and more data sets are created in which only yaw variables are stored for which the characterizing physical variable is approximately the same during the braking operation.

After sufficient repetition, there is thus an individual database for each vehicle, comprising several data sets containing empirical data, so that if a braking operation is detected again, the yaw variable is assigned to one of these data sets and a corrective braking force can be determined on the basis of the yaw variables already present in the data set and the currently detected yaw variable. The corrective braking force is based here on the yaw variables detected within the data set which are already present.

Subsequently, an automatic adjustment of a braking force at a brake can take place, so that a compensating torque opposite to the yaw variable is created and compensates the latter.

According to one aspect of the disclosure, steps b) to g) are performed continuously by a control system integrated in the vehicle, as long as the braking operation is detected in step a). Thus, during the braking operation, on the one hand, data are continuously collected and stored by assigning detected yaw variables to a data set on the basis of the characterizing physical variable, and, on the other hand, continuous control is implemented by introducing a corrective braking force on the basis of the data sets (provided that all conditions are fulfilled), so that the yaw variable decreases, and the vehicle is stabilized.

This means that a closed control loop is provided. This has the advantage that changes that occur over time and influence the driving behaviour do not have to be known exactly, as they are detected anyway. The corrective braking force is continuously corrected and adjusted to the current yaw behaviour of the vehicle during braking operations.

Furthermore, it is conceivable that the system is self-learning and recognizes and takes into account changes in vehicle behaviour during braking operations.

The at least one state condition in step b) can comprise one or more of the following conditions:
  the steering angle is below a predefined limit steering angle,
  the camber of the road is below a predefined limit slope angle,
  a change in the braking force gradient is below a limit value,
  the brake pedal acceleration gradient is below a limit value,
  there are no bumps in the road,
  no slip control system and/or driving stability system is active,
  the coefficient of friction between the tyre and the road is above a minimum coefficient of friction,
  the coefficient of friction difference between vehicle wheels of an axle and the road is below a limit value, and
  the tyre pressure is within a pressure tolerance.

It is conceivable here that the storage of the detected yaw variable in step d) only takes place if the at least one state condition in step b) is fulfilled during the temporal observation window, or, if several state conditions are to be fulfilled, these several conditions are fulfilled.

The state conditions are intended to ensure that a possible corrective braking force is only applied during braking operations that are considered to be normal in driving operation, whereas braking operations that constitute exceptional events, such as emergency braking or skidding and subsequent braking, are excluded.

Furthermore, the at least one state condition s intended to ensure that the yaw variables are only stored and an automatic adjustment of the braking force takes place only if the braking operation moves within certain limits at which the assignment of the detected yaw variable to a data set makes sense and a corrective braking force can be reliably determined that leads to the compensation of the yaw variable.

In one exemplary arrangement, the method should only be used when the steering angle is low and the vehicle is not cornering.

The limit slope angle for the camber of the road serves to ensure that the braking operation and the yaw variable detected in the process are not too strongly influenced by the camber of the road.

Furthermore, the braking force gradient and the brake pedal acceleration gradient should be below a limit value so that, for example, emergency braking is recognized and the method does not store and assign the yaw variable to a data set for braking operations in which the braking force gradient and/or the brake pedal acceleration gradient are outside of usual values.

In addition, there should be no or only negligible bumps in the road, so that the braking operation and thus the absorbed yaw variable is not influenced by any bumps in the road.

Furthermore, no slip control system and/or driving stability program should be active, i.e. intervene at the same time, such as an anti-lock braking system, as this would also not allow a meaningful assignment of the present yaw variable to a data set on the basis of the characterizing physical yaw variable.

In addition, the at least one state condition can also comprise that the coefficient of friction is above a minimum coefficient of friction and that the coefficient of friction difference between vehicle wheels of an axle is below a limit value so that, for example, slippage during the braking operation, even at only one wheel, can be excluded.

Lastly, a state condition can be that the tyre pressure is within specified pressure tolerances. Since tyre pressure can significantly influence braking operations, it can be an important parameter to consider in order to ensure that all recorded yaw sizes have at least approximately similar tyre pressures during a braking operation.

The yaw variable in step b) can be the yaw rate and/or the yaw moment.

The yaw rate provides information here regarding the angular velocity of the vehicle about its own vertical axis, thus it can be concluded from this with which dynamics the vehicle executes the yaw movement, and on the basis of this the corrective braking force can be transferred to the vehicle wheel quickly or slowly accordingly.

Detecting the yaw moment has the advantage that the variable constituted by the yaw moment can be used to directly infer what lateral force is needed to compensate the yaw moment, so that the corrective braking force can be determined quickly and easily.

The yaw rate can be determined by a yaw rate sensor and/or the yaw moment can be determined on the basis of the braking forces.

Since the yaw rate sensor is usually installed in the vehicle anyway, as the yaw rate is often required for driving safety systems, there is no additional effort and no additional cost.

Furthermore, the yaw moment can be estimated particularly easily and sufficiently accurately from the braking forces acting on the vehicle wheels, so that a representative yaw moment can be determined.

Advantageously, the braking forces can be determined via the position of the wheel brake actuators and/or clamping force sensors on the brakes.

In the case of electromechanical brakes, the position of the wheel brake actuator is typically known anyway, and therefore the clamping force that the wheel brake actuator applies to the brake disc via the brake pad can be inferred, from which the circumferential force generated at the brake disc can be derived. From this, in turn, the effective braking force between the vehicle wheel and the road can be deduced (taking into account the ratio of the mean brake disc radius to the dynamic tyre radius).

Clamping force sensors of the brakes also allow a conclusion to be drawn about the clamping force generated by the wheel brake actuator and acting on the brake pad and the brake disc, which allows the effective braking force between the vehicle wheel and the road to be determined during the braking operation.

In addition, it is also conceivable that in electromechanical braking systems, the current consumption of the electric wheel brake actuator can be used to determine how high the applied clamping force is. In this case, no further component is necessary to detect the clamping force.

The at least one physical variable characterizing the current braking operation in step b) can comprise at least one of the following variables:

control information of the at least two individually actuatable brakes,
time data present during the braking operation,
an average value and/or a maximum value of the braking deceleration and/or the total braking force,
the brake pedal travel, and
the slip angle.

All these variables behave at least to some extent proportionally to the yaw variable and are therefore suitable for characterizing the braking operation during the observation window.

The braking operation can be characterized via the control information, as this provides information about how much deceleration is taking place.

The time data can provide information on when the yaw variable was recorded so that the moment in time or time period at or within which the data were recorded is known and so some change in yaw variable within data sets over time can also be determined.

The average value and/or the maximum value of the braking deceleration and/or the total braking force is also suitable for characterizing the braking operation, as the yaw variable present typically also decreases or increases depending on the braking force.

The brake pedal travel can also serve as a characterizing variable, as this also provides information about how much (percentage of) braking power is requested during the braking operation.

The two individually actuatable brakes can each comprise an electric wheel brake actuator and the control information can be the motor position of the electric wheel brake actuators and/or the clamping force.

The advantages resulting from this can be seen in the explanations above.

The yaw variable in step c) can be stored in step d) in the form of an average value or maximum value present during the observation window. This has the advantage that only one value for the yaw variable is stored per observation window.

The data set in step d) can be assigned the yaw variables and those physical variables characterizing the braking operation that lie within a defined range. Thus, each data set is assigned a defined range of characterizing physical variables, in which yaw variables are stored if their characterizing physical variable lies within the range. The resolution of the ranges can be used to determine the detail with which the data collection and thus also the subsequent determination of the corrective braking force takes place.

Before step f), the data set can be queried to determine whether there are sufficiently assigned stored data sets for the current braking operation and/or the current yaw variable. Step b) is carried out if sufficient data sets are present. This ensures that a determination of the corrective braking force and an automatic adjustment of the braking force only take place if sufficient data are present, and therefore a reliable statement can be made about the usual yaw variable during the current braking operation for specific characterizing physical variables.

The determination of the corrective braking force in step f) can also be carried out using data sets that are adjacent to the data set that does not comprise sufficient data. This refers to data sets to which yaw variables are assigned that have characterizing physical variables that are similar to the data set to which the yaw variable of the current braking operation is assigned. Thus, for example, an interpolation can be carried out on the basis of adjacent data sets in order to make a reliable statement about the usual yaw variable, even for the still insufficient data set that lies between the adjacent data sets.

If a defined maximum threshold of the corrective braking force determined in step f) is exceeded, for example, no automatic adjustment of the braking force of at least one brake can take place in step g) and a message can be issued instead.

This message can be processed in terms of signalling and, for example, displayed to the driver in the on-board computer. In this way, it can be ensured that if an extraordinarily large corrective braking force is necessary to compensate braking force differences, a prompt is issued to check the braking system of the vehicle.

If the corrective braking force determined in step f) falls below a minimum threshold, for example, no automatic adjustment of the braking force of at least one brake can take place in step g).

This minimum threshold represents a value below which only a negligibly small yaw variable is present, so that no compensation is required.

In step f), the braking force of at least one front wheel brake can be adjusted. Because the brakes are usually larger on the front axle, a corrective braking force can thus be applied effectively and efficiently.

In step f), the determination of which of the individually actuatable brakes is subject to an increase and/or which of the individually operable brakes is subject to a decrease in braking force can be determined as a function of the sign of the yaw variable.

This means that a yaw variable can be counteracted by either increasing the braking force on one vehicle wheel or decreasing the braking force on one vehicle wheel.

Furthermore, it is also possible to both increase and decrease the braking forces on two different wheels in order to divide up the actually necessary corrective braking force. In the case of high yaw moments, such a division of the corrective braking force among two different vehicle brakes has proven to be particularly advantageous.

The corrective braking force can be determined in step f) using a predefined target quantity of stored yaw variables, or using a quantity of stored yaw variables that are within a certain time window of a current braking operation, or using a quantity of stored yaw variables that are within a certain mileage window, starting from the mileage at the time of the braking operation.

All of these measures are intended to ensure that the stored yaw variables used to determine the corrective braking force are up-to-date to a certain extent and accordingly also a reliable informative force with regard to the corrective braking force to compensate the yaw moment.

The predefined target quantity is intended to ensure that a minimum quantity is taken into account when calculating the yaw variable, so that exceptionally high and low yaw variables within a data set balance each other out on average.

By considering yaw variables recorded within a certain time window, it is possible to determine the maximum age of the oldest data used to determine the corrective braking force.

The mileage window makes it possible to take into account only yaw variables that lie within a certain range from the current mileage, so that, for example, wear in the braking system or also of chassis components that increases over the mileage is included in the calculation of the corrective braking force as currently as possible and to a sufficient extent.

An apparatus for compensating a yaw moment acting on a vehicle, and for carrying out the method according to the disclosure is also disclosed. The apparatus comprises a vehicle braking system which comprises at least two individually actuatable brakes, a sensor device for detecting a yaw variable, at least one further sensor device for detecting data during braking operations, at least one vehicle axle with two vehicle wheels, wherein the vehicle wheels can be braked independently of one another by the individually actuatable brakes, a control system which is integrated in the vehicle and which is set up to continuously query conditions on the basis of the determined vehicle-related data and to store the yaw variable together with further vehicle-related data in a data memory, wherein the control system determines a corrective braking force depending on the yaw variables stored in the data memory and changes the braking force of at least one individually actuatable brake depending thereon in order to reduce the yaw variable.

This apparatus can be easily implemented, especially in modern vehicles, as the required components and parts are largely installed as standard anyway. The advantages additionally resulting can be seen in the paragraphs above.

The individually actuatable brakes of the vehicle braking system can comprise electric wheel brake actuators. The electric wheel brake actuators allow, as already described in the above paragraphs, a simple determination of the braking forces present at the vehicle wheels by determining the position of the wheel brake actuators and/or the current consumption of the electric wheel brake actuators.

The sensor device can comprise a yaw rate sensor to detect the yaw rate and/or a position or travel sensor to determine the position of the wheel brake actuators by which the braking force at each vehicle wheel can be determined and/or a clamping force sensor on each brake to determine the braking force at each vehicle wheel.

The yaw rate sensor is a simple and cost-effective component that is usually installed in the vehicle anyway.

The travel sensor is installed in electric wheel brake actuators anyway in order to be able to reliably determine their position, and represents a cost-effective component via which the yaw moment acting on the vehicle can be estimated with sufficient accuracy on the basis of the braking force at each vehicle wheel.

Using the clamping force sensor, the braking force at each vehicle wheel can be determined precisely, which has a positive effect on the determination of the yaw moment.

The at least one sensor device for detecting data during braking operations comprises a steering angle sensor and/or an inclination sensor for measuring the camber of the road and/or a travel sensor for measuring the brake pedal travel and/or a force sensor for measuring the brake pedal force and/or an acceleration sensor and/or chassis sensors for detecting bumps in the road and/or sensors for determining the value of the braking force difference between opposing vehicle wheels and/or pressure sensors to determine the tyre pressure.

The advantages resulting from this can be seen in the paragraphs above.

BRIEF DESCRIPTION OF DRAWINGS

The disclosure is described below with reference to various exemplary arrangements illustrated in the accompanying drawings. In the figures.

DETAILED DESCRIPTION

Figure 1:
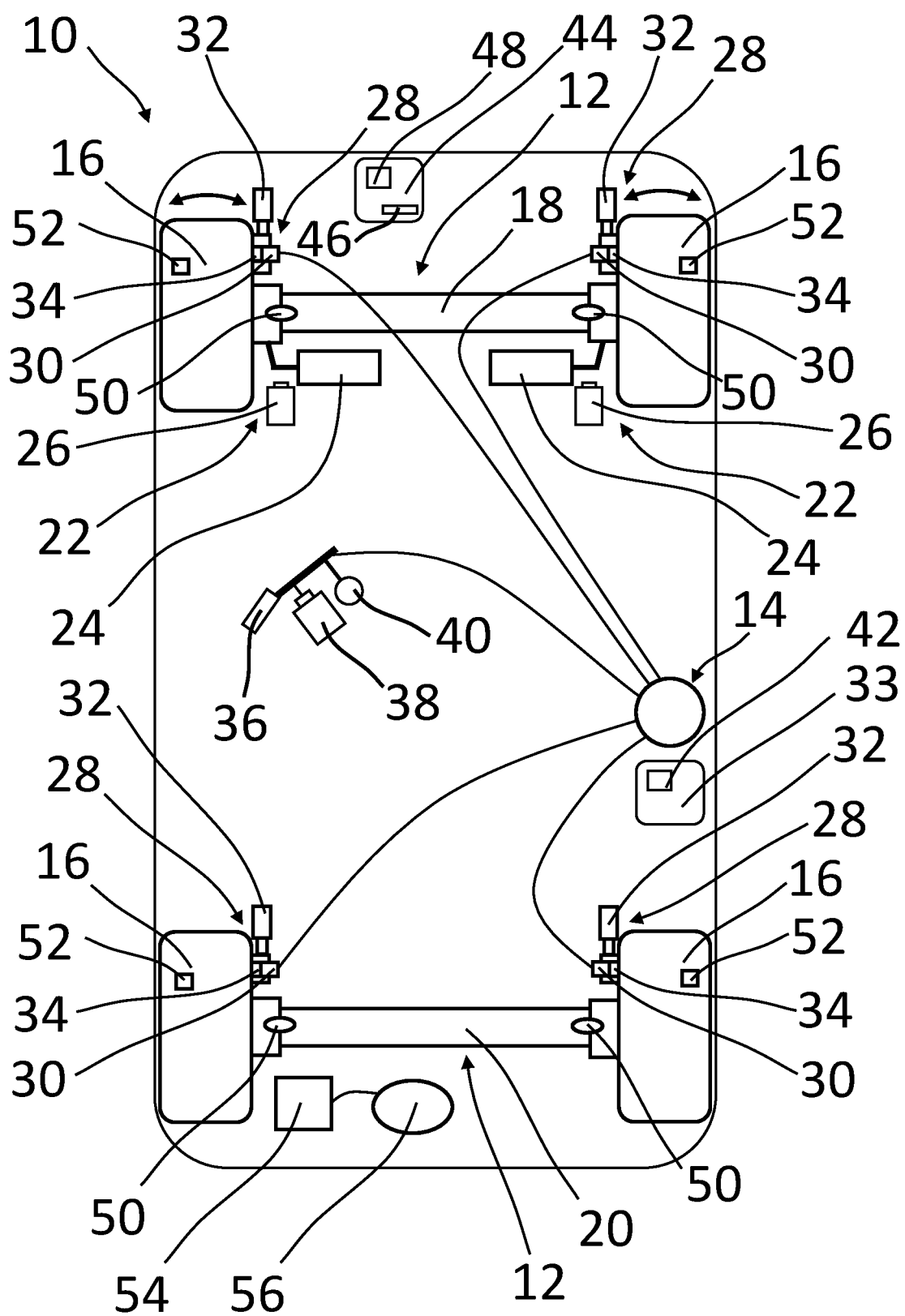
FIG. 1 shows a schematic drawing of a vehicle equipped with the apparatus according to the disclosure in plan view, representative of various exemplary arrangements by which the method according to the disclosure is carried out.

FIG. 1 shows a vehicle 10 with two vehicle axles 12 and a braking system 14 as part of an apparatus for compensating a yaw moment.

The two vehicle axles 12 each have two vehicle wheels 16 and are divided into a steered front axle 18 and an unsteered rear axle 20.

According to a further exemplary arrangement, it is also conceivable that the steered vehicle axle forms the rear axle 20, and the unsteered vehicle axle forms the front axle 18.

Furthermore, arrangement is also possible in which both the front axle 18 and the rear axle 20 form a steered vehicle axle.

The steered front axle 18 comprises a steering system 22 by which a steering angle can be applied to the vehicle wheels 16 of the steered front axle 18.

The steering system 22 comprises steering angle sensors 26 which can be used to detect the steering angles of the two vehicle wheels 16.

The braking system 14 of the vehicle 10 comprises four individually actuatable, for example electromechanical brakes 28, the wheel brake actuators 30 of which can be adjusted, for example electrically, so that all vehicle wheels 16 can be individually braked via the braking system 14. Thus, the braking system 14 can be a brake-by-wire system.

In addition, the braking system 14 comprises position or travel sensors 32 on each brake 28 to enable the position of the electric wheel brake actuators 30 to be determined.

The position or travel sensors 32 are assigned to a sensor device 33.

In addition, or instead of the travel sensors 32, the braking system 14 comprises clamping force sensors 34 that are used to determine the force applied by the electric wheel brake actuator 30 at each brake 28.

The clamping force sensors 34 are also assigned to the sensor device 33.

The individually actuatable brakes 28 of the braking system 14 are actuated by the driver via a brake pedal 36.

A force sensor 38 is provided on the brake pedal 36 and is used to detect the brake pedal force applied by the driver.

Furthermore, a travel sensor 40 is arranged on the brake pedal and is used to determine the brake pedal travel.

The aforementioned sensor device 33 can comprise, in addition to the travel sensor 32 and the clamping force sensor 34, or instead of these sensors, a yaw rate sensor 42, which is used to determine the yaw rate present when the vehicle 10 is yawing.

The sensors 26, 32, 34, 38, 40, 42 and the sensor device 33 are part of the aforementioned apparatus.

In addition, the apparatus comprises a further sensor device 44 for acquiring data during braking operations.

The further sensor device 44 comprises an inclination sensor 46 for measuring the camber of the road.

The sensor device 44 is also coupled to the travel sensor 40, which is used to measure the pedal travel.

Furthermore, the force sensor 38, which is used for brake pedal force measurement, is also coupled to the sensor device 44.

In addition, the sensor device 44 can comprise at least one acceleration sensor 48. The acceleration sensor 48 can be used to record the accelerations prevailing during the braking operation.

In addition, a second acceleration sensor 48 can also be provided, which is used to detect the brake pedal acceleration gradient during the braking operation.

The sensor device 44 is assigned road sensors 50, which are used to detect bumps in the road.

Furthermore, the sensor device 44 is also connected in terms of signalling to the clamping force sensors 34.

Lastly, the sensor device 44 comprises pressure sensors 52 which are used to determine the tyre pressure of the vehicle wheels 16.

Furthermore, the apparatus comprises a control system 54 integrated in the vehicle. The control system 54 integrated in the vehicle is coupled here to the sensors 26, 32, 34, 38, 40, 42, 46, 48, 50, 52 and to the sensor device 33, the sensor device 44, and the electric wheel brake actuators 30.

A data memory 56 is also provided. The data memory is connected to the control system 54 integrated in the vehicle.

An exemplary method for controlling the vehicle braking system on the basis of vehicle-specific data for compensating the yaw moment using the apparatus is explained below with reference to FIGS. 2 to 6.

Figure 2:
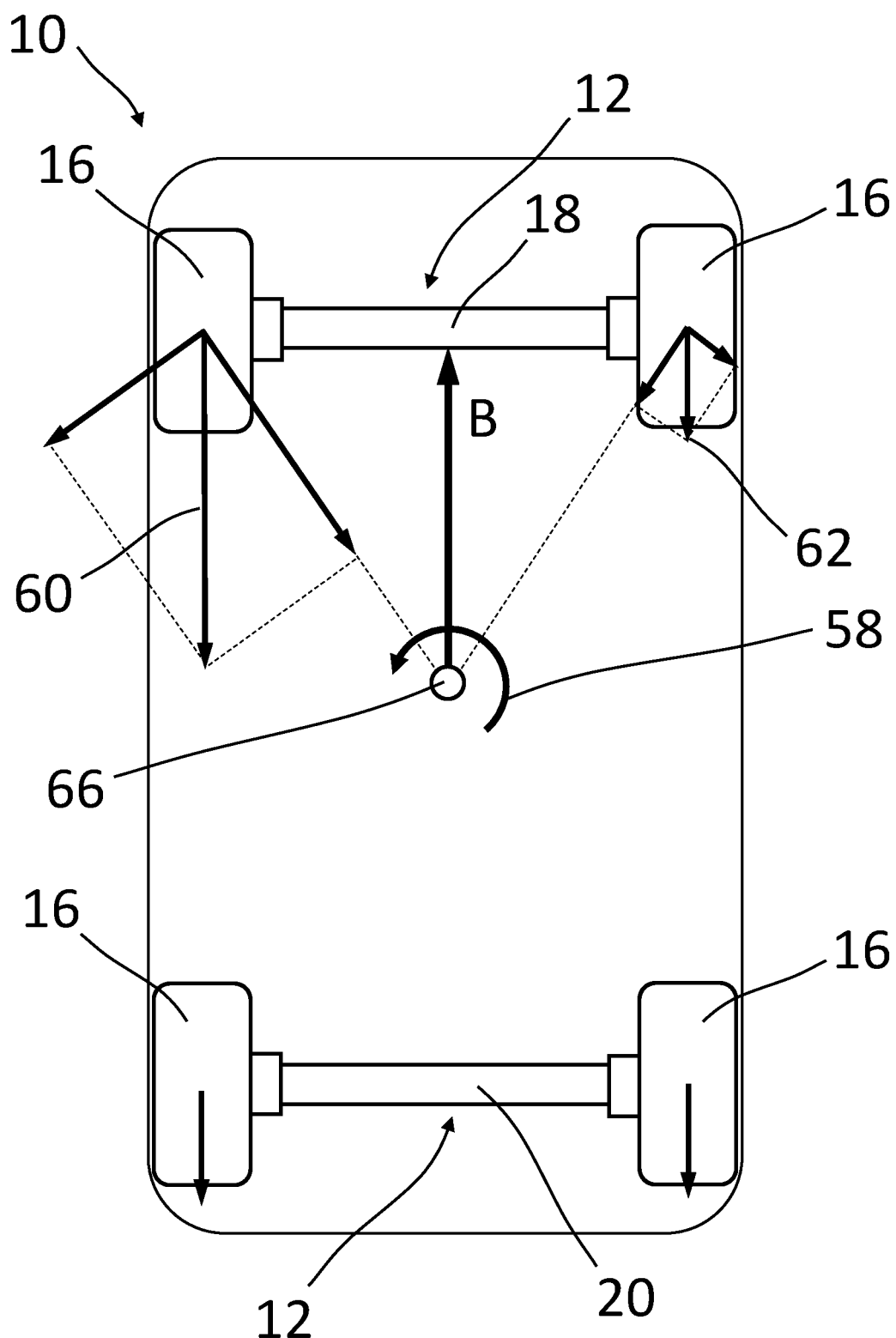
FIG. 2 shows a schematic drawing of the vehicle in plan view during a braking operation.
Figure 3:
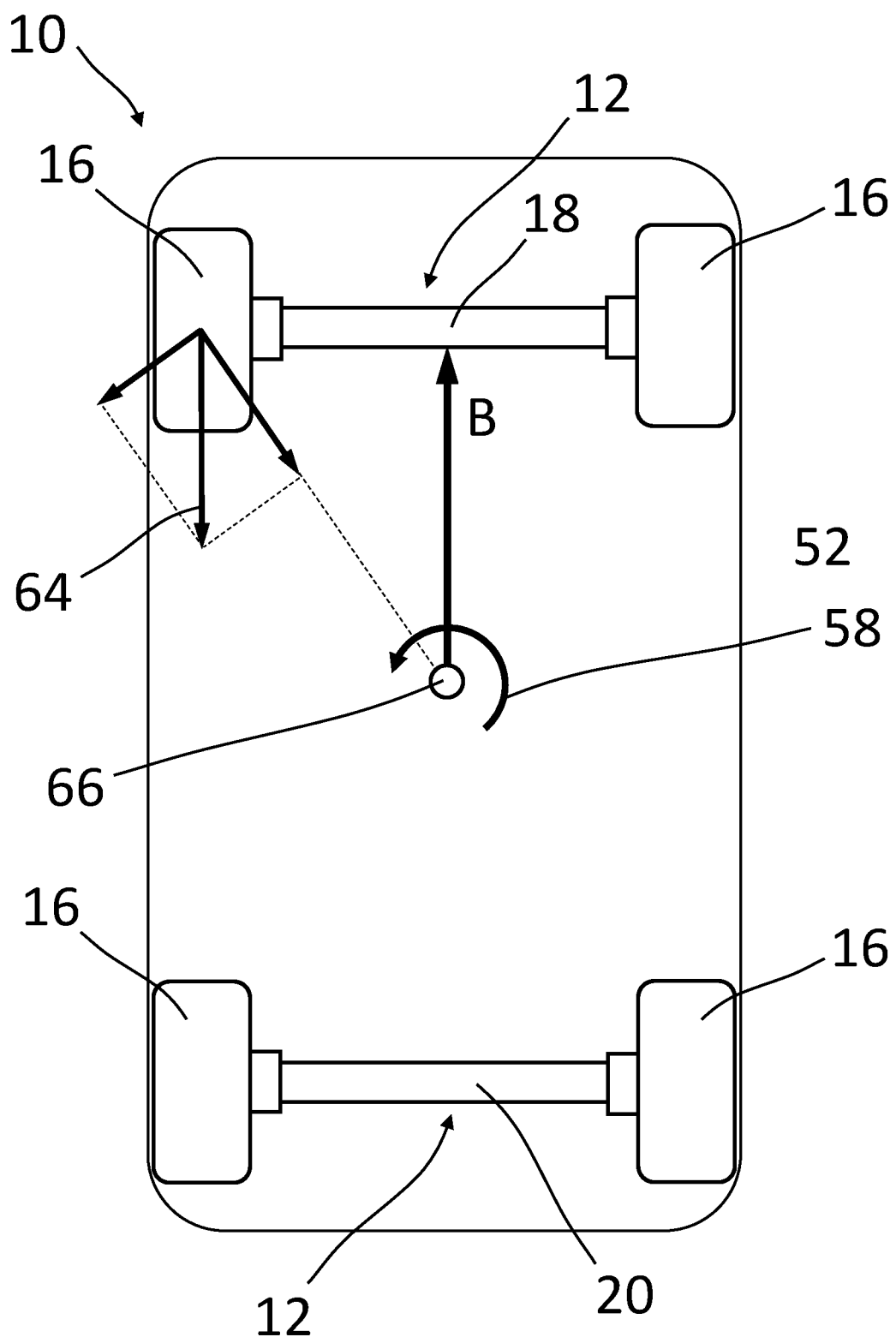
FIG. 3 shows a schematic drawing of the vehicle in plan view during a braking operation, wherein only the prevailing braking force difference is shown.
Figure 4:
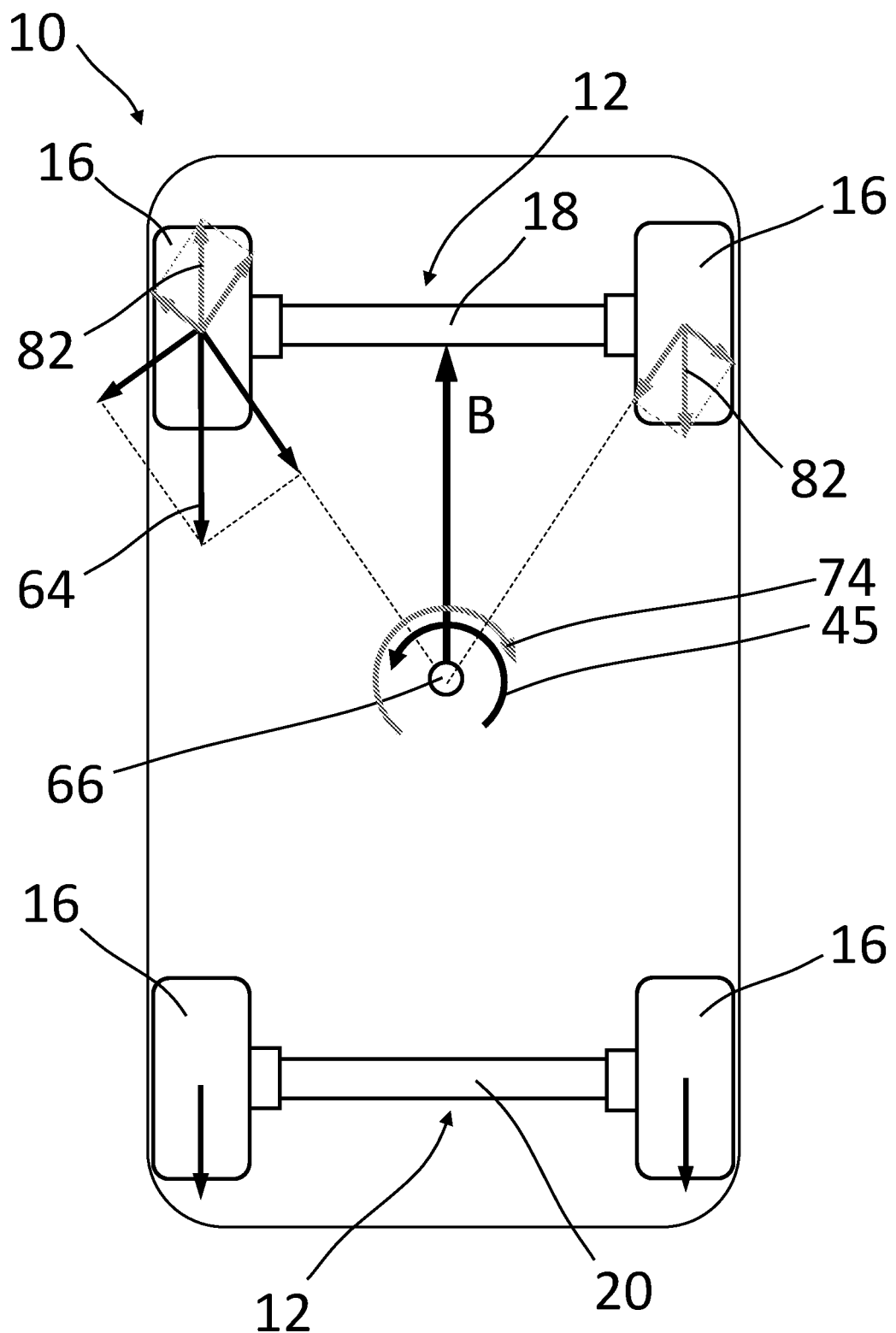
FIG. 4 shows a schematic drawing of the vehicle in plan view during the braking operation, in which a corrective braking force is applied to the vehicle wheels.

In order to improve clarity, FIGS. 2 to 4 largely do not show the components and parts explained above.

A yaw moment 58 can be present during braking operations when driving straight ahead if asymmetric braking forces 60, 62 occur on at least one vehicle axle (see FIG. 2).

The inequality of the braking forces results in a braking force difference 64 (see FIG. 3).

For example, there can be a braking force 60 at the left vehicle wheel 16 of the front axle 18 that is greater than the braking force 62 that is present at the right vehicle wheel 16 of the front axle 18. This results in a braking force difference at the front axle 18, wherein both braking forces have the same lever arm in relation to a vehicle centre of gravity 66. Therefore, there is no moment compensation of the moments generated by the braking forces 60, 62, thus resulting in a yaw moment 58. This causes the vehicle 10 to yaw, which is induced by the yaw moment 58 (see FIGS. 2 and 3).

For each vehicle, the following method is carried out during driving.

In a first step of the method, a braking operation is recognized, which decelerates the vehicle 10.

In a second step of the method, state conditions influencing the braking operation are queried during a temporal observation window. The querying of the state conditions ensures that the steering angle of the vehicle wheels 16 of the steered front axle 18 detected by the steering angle sensor 26 is below a predefined limit angle.

It is further queried whether the inclination of the road detected by the inclination sensor 46 is below a predefined limit angle.

Furthermore, it is queried whether the change in the braking force gradient and the brake pedal acceleration gradient, which are determined, for example, via the acceleration sensor 48 via the clamping force sensors 34 and via the travel sensor 40, respectively, are each below the limit value.

In addition, the chassis sensors 50 are used to check whether there are any bumps in the road that could influence the braking operation.

A slip control system and/or a driving stability system should also not be active to fulfil the condition, i.e. should not currently exert any control.

Furthermore, the coefficient of friction between the tyre and the road must be above a minimum coefficient of friction. This can be determined, for example, on the basis of the available braking forces at all wheels.

In addition, the coefficient of friction difference between the vehicle wheels of an axle and the road must be below a limit value, i.e. the coefficients of friction must not differ too much from each other.

Lastly, the tyre pressures of all vehicle wheels 16 that can be determined via the pressure sensors 52 must lie within a pressure tolerance.

In the next step of the method, the yaw variable acting on the vehicle 10 within the observation window and a physical variable present at the same time and characterizing the current braking operation are detected.

According to a first exemplary arrangement of the method, the yaw variable is the yaw rate of the vehicle 10, which is detected by the yaw rate sensor 42 of the sensor device 33.

According to a further exemplary arrangement, the yaw variable is the yaw moment present, which is determined on the basis of the braking forces present at the vehicle wheels 16.

Figure 5:
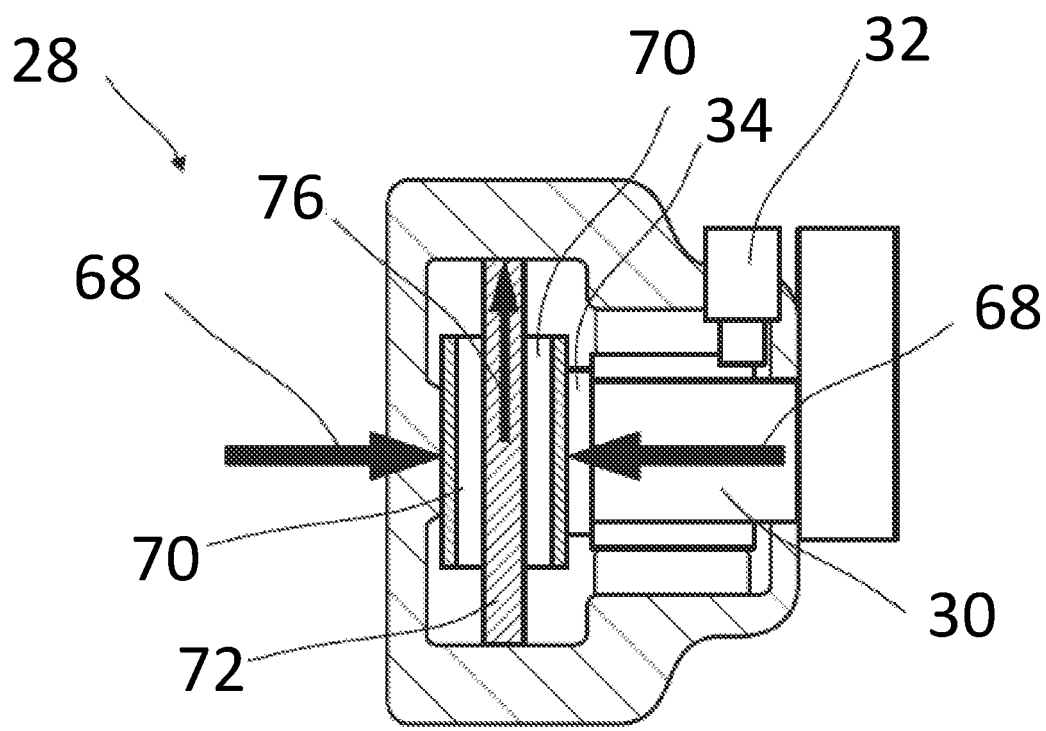
FIG. 5 shows a schematic detailed view of a brake in section.
Figure 6:
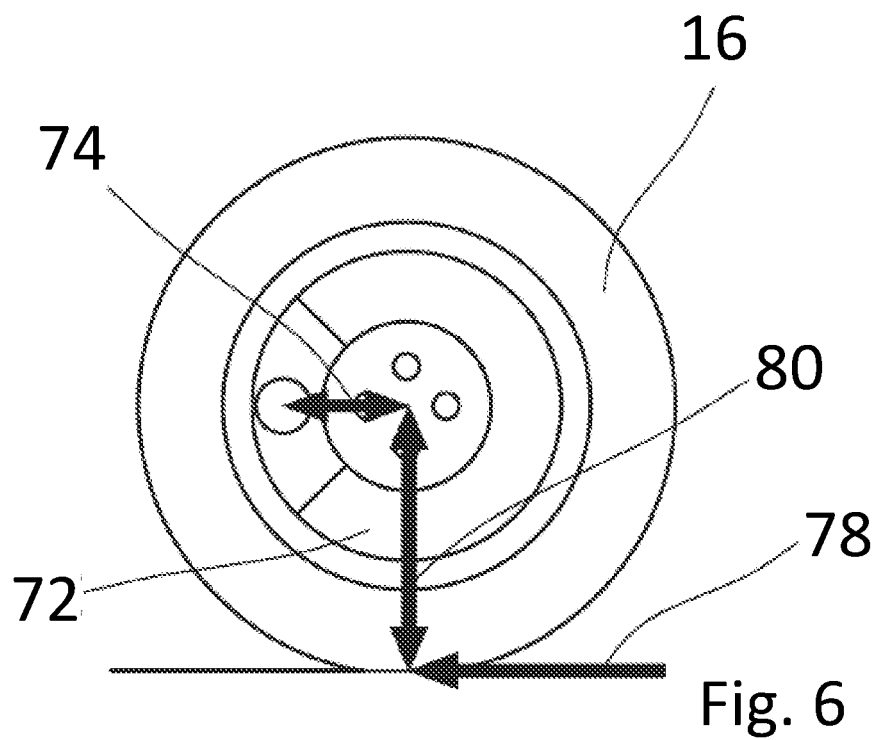
FIG. 6 shows a schematic detailed view of a vehicle wheel during a braking operation.

The determination of the braking forces at all four vehicle wheels 16 can be carried out according to different variants, which are explained below with reference to FIGS. 5 and 6. All of these variants are based on determining a clamping force 68 which us applied by the electric wheel brake actuator 30 and with which brake pads 70 press on a brake disc 72. The clamping force 68 between the brake pads 70 and the brake disc 72 and the present friction value can be used to determine the circumferential force 76 acting on the effective brake disc radius 74. Subsequently, a braking force 78 acting between the vehicle wheel 16 and the road surface can be concluded via the product of the circumferential force 76 with the ratio of the effective brake disc radius 74 and a dynamic tyre radius 80.

According to a variant of the exemplary arrangement, the determination of the braking force 78 via the damping force 68 is carried out by the clamping force sensors 34, which are arranged on the brakes 28.

According to a second variant of the exemplary arrangement, the clamping force 68 is determined via the position of the wheel brake actuators 30, which is detected by the travel sensors 32.

According to a further variant of the exemplary arrangement, the current consumption of the individual electric wheel brake actuators 30 is used to infer the clamping force 68 generated, from which the braking force 78 can be derived.

The at least one physical variable characterizing the current braking operation comprises control information of the at least two individually actuatable brakes 28 and their electric wheel brake actuators 30.

Further, the variable includes time data present during the braking operation. Furthermore, the characterizing variable contains an average value and/or a maximum value of the braking deceleration and/or the total braking force that is present within the observation window with the detected yaw variable.

Further, the characterizing variable can include the brake pedal travel, which provides information about the actuation of the brakes 28.

In addition, the slip angle that exists during the braking operation within the observation window can also be detected as a characterizing variable.

In the next step of the method, if the previously explained state conditions are present during the observation window, the detected yaw variable is stored in the data memory 56 and assigned to a data set of the data memory 56, wherein this assignment is made on the basis of the characterizing physical variable.

Of course, only individual or groups of state conditions can be considered.

Thus, each data set contains only yaw variables of which the characterizing physical quantities are at least similar and lie within a certain range of values.

This allows a comparability of the yaw variables and makes it possible to quantify changes in the yaw variable.

The yaw variable can be stored in the form of an average value during the observation window. Alternatively, it is also possible to store the maximum value of the yaw variable present during the observation window.

The previously explained steps are repeated in accordance with the method for further braking operations, so that a database consisting of several data sets is created and is available in the data memory 56 of the vehicle.

The data set is continuously queried to determine whether sufficiently assigned stored data sets are present for the current braking operation and/or the current yaw variable, so that the next step is carried out if there are sufficient data sets for the current braking operation and/or the current yaw variable.

Alternatively, data sets can be considered that use characteristic physical variables similar to those of the current braking operation, so that the corrective braking force 82 is determined via these data sets adjacent to the current state.

In this next step of the method, a corrective braking force 82 is determined. This corrective braking force 82 is based on the yaw variables, already detected within the data sets, that are present with the currently present characterizing variables during braking operations. The yaw variable can be used to determine the braking force difference 64 that causes the yaw moment 58 about the vehicle centre of gravity 66. The corrective braking force serves to offset or compensate the braking force difference 64.

When determining the corrective braking force 82, the direction of rotation of the yaw moment 58 is also taken into account.

In this case, according to a variant, only a predefined target quantity of stored yaw variables is taken into account when determining the corrective braking force.

According to a further variant, the determination of the corrective braking force 82 takes place on the basis of a quantity of stored yaw variables that lie within a certain time window from the current braking operation. This ensures that only data that are up-to-date to a certain extent are taken into account.

According to a third option, only yaw variables that lie within a certain mileage window, starting from the mileage, at the time of the braking operation, are determined when determining the correction force 82. This also ensures that the data are up-to-date.

According to all three options, it is possible here that data which are not (any longer) used for the calculation of the corrective braking force are deleted from the data memory 56.

In the next step, the braking force is automatically adjusted at the individually actuatable brakes 28. By superimposing the corrective braking force with the braking force called up by the driver during the braking operation, a compensating torque 74 is generated which counteracts the yaw moment 58. As a result, the value of the yaw variable decreases and the vehicle 10 is stabilized.

The corrective braking force is applied exclusively by the individually actuatable brakes 28 of the front axle 18.

It is conceivable here that the corrective braking force 82 is applied exclusively to one vehicle wheel, where the braking force is increased to counteract the braking force difference 64, or the corrective braking force 82 is divided and applied to both vehicle wheels. The corrective braking force 82 at the wheel at which the braking force difference 64 exists is adjusted by reducing the acting braking force at the individually actuatable brake 28. An increase in braking force takes place at the second individually actuatable brake 28 assigned to the front axle 18.

According to further alternatives, the corrective braking force 82 can also be applied exclusively to the brakes 28 of the rear axle 20, or distributed over all wheels of the vehicle axles 18 and 20.

The adjustment of the braking force difference 64 at the individually actuatable brakes 28 is carried out here via the control system 54 integrated in the vehicle, which is coupled to the braking system 14, whereby a control of the individually actuatable brakes 28 or their electric wheel brake actuators 30 is possible.

The invention claimed is:

1. A method for controlling a vehicle braking system on the basis of vehicle-specific data, wherein the vehicle braking system comprises at least two individually actuatable brakes, the method comprising:
   a) recognizing a braking operation;
   b) querying at least one state condition influencing the braking operation during a temporal observation window;
   c) detecting a yaw variable present within the temporal observation window and during the braking operation and at least one physical variable present at the same time which characterizes the braking operation;
   d) in the presence of the at least one state condition during the temporal observation window, storing the detected yaw variable and assigning the yaw variable to a data set comprising the at least one physical variable characterizing the braking operation;
   e) repeating steps a) to d) for further braking operations to create a database comprising multiple data sets;
   f) determining a corrective braking force in a subsequent braking operation on the basis of one of the multiple data sets assigned to a current characterizing physical variable; and
   g) automatically adjusting a braking force of at least one actuatable brake of the vehicle braking system depending on the corrective braking force to reduce the yaw variable.

2. The method according to claim 1, wherein steps b) to g) are performed continuously by a control system integrated in the vehicle as long as the braking operation is detected in step a).

3. The method according to claim 1, wherein the at least one state condition in step b) comprises one or more of the following conditions:
   a steering angle is below a predefined limit steering angle,
   a camber of the road is below a predefined limit slope angle,
   a change in a braking force gradient is below a limit value,
   a brake pedal acceleration gradient is below a limit value,
   there are no bumps in a driving surface,
   no slip control system and/or driving stability system is active,
   a coefficient of friction between a tyre and the driving surface is above a minimum coefficient of friction,
   the coefficient of friction difference between vehicle wheels of an axle and the driving surface is below a limit value, and
   a tyre pressure is within a pressure tolerance.

4. The method according to claim 1, wherein the yaw variable in step c) is a yaw moment.

5. The method according to claim 1, wherein the yaw variable in step b) is a yaw rate.

6. The method according to claim 5, wherein the yaw rate is determined via a yaw rate sensor.

7. The method according to claim 1, wherein the at least one physical variable characterizing the braking operation in step c) comprises at least one of the following variables:
   control information of the at least two individually actuatable brakes,
   time data present during the braking operation,
   an average value or a maximum value of the braking deceleration and/or the total braking force,
   a brake pedal travel, and
   a slip angle.

8. The method according to claim 7, wherein the two individually actuatable brakes each comprise an electric wheel brake actuator and the control information is a motor position of the electric wheel brake actuators or a clamping force.

9. The method according to claim 1, wherein the yaw variable in step c) is stored in step d) in a form of an average value or maximum value present during the observation window.

10. The method according to claim 1, wherein the data set in step d) is assigned the yaw variables and the physical variables characterizing the braking operation which lie within a specified range.

11. The method according to claim 1, wherein, before step f), the data sets are queried to determine whether there are a predefined number of assigned stored data sets for the current braking operation or the current yaw variable, and step g) is carried out when the predefined number of assigned stored data sets are present.

12. The method according to claim 1, wherein the corrective braking force is determined in step f) using a predefined target quantity of stored yaw variables, or using a quantity of stored yaw variables that are within a certain time window of the current braking operation, or using a quantity of stored yaw variables that are within a certain mileage window of the vehicle, starting from a mileage at a time of the braking operation.

* * * * *